United States Patent
Teng et al.

(10) Patent No.: US 9,465,158 B2
(45) Date of Patent: Oct. 11, 2016

(54) LIGHT-GUIDE COUPLER FOR MODULATING ANGULAR AND SPATIAL DISTRIBUTIONS OF LIGHT SOURCE

(71) Applicant: National Taiwan Normal University, Taipei (TW)

(72) Inventors: Tun-Chien Teng, Taipei (TW); Li-Wei Tseng, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 23 days.

(21) Appl. No.: 14/477,220

(22) Filed: Sep. 4, 2014

(65) Prior Publication Data

US 2016/0070051 A1    Mar. 10, 2016

(51) Int. Cl.
*F21V 7/04* (2006.01)
*F21V 8/00* (2006.01)

(52) U.S. Cl.
CPC ........... *G02B 6/0038* (2013.01); *G02B 6/0046* (2013.01)

(58) Field of Classification Search
CPC G02B 6/0038; G02B 6/0046; G02B 6/0036; G02B 6/004; G02B 6/0041; G02B 6/0043
USPC ...................................... 362/625, 626, 623
See application file for complete search history.

(56) References Cited

U.S. PATENT DOCUMENTS

| | | | | |
|---|---|---|---|---|
| 5,078,516 | A * | 1/1992 | Kapon | G02B 6/1228 385/129 |
| 5,613,751 | A * | 3/1997 | Parker | G02B 6/0018 362/23.16 |
| 6,614,951 | B2 * | 9/2003 | Lin | G02B 6/12014 385/15 |
| 2005/0072032 | A1 * | 4/2005 | McCollum | F21V 5/00 40/546 |
| 2013/0314944 | A1 * | 11/2013 | McCollum | F21V 5/00 362/608 |

* cited by examiner

*Primary Examiner* — Anh Mai
*Assistant Examiner* — Glenn Zimmerman
(74) *Attorney, Agent, or Firm* — Muncy, Geissler, Olds & Lowe, P.C.

(57) ABSTRACT

A light-guide coupler for modulating angular and spatial distributions of a light source is provided. The light-guide coupler includes a transmission body and a microstructure portion. One end of the transmission body defines a first opening. The other end of the transmission body defines a second opening. The width of the transmission body increases in a direction from the first opening to the second opening and forms a curved portion in at least one side plane of the transmission body. The microstructure portion is configured on one plane of the transmission body. An inner reflecting surface is formed in the transmission body and matched to the microstructure portion and curved portion. The inner reflecting surface forms a light transmission path between the first opening and the second opening.

8 Claims, 6 Drawing Sheets

LIGHT-GUIDE COUPLER FOR MODULATING ANGULAR AND SPATIAL DISTRIBUTIONS OF LIGHT SOURCE

BACKGROUND OF THE INVENTION

1. Field of the Invention

The present invention relates to a light-guide coupler. More particularly, the present invention relates to a slim light-guide coupler for modulating angular and spatial distributions of a light source.

2. Description of the Prior Art

To provide collimating light, conventional techniques use a compound parabolic collector (CPC) to transform the light from Lambertian distribution to collimating distribution. The light-angle distribution relationship of a CPC complies with the following equation:

$$\frac{A_1}{A_2} = \left(\frac{n_2 \sin(\theta_2)}{n_1 \sin(\theta_1)}\right)^2 \quad (1)$$

$A_1$ and $A_2$ respectively denote the section area of the input and output. $\theta_1$ and $\theta_2$ respectively denote the angle distribution of input and output. $n_1$ and $n_2$ are the refractive index of the respective medium.

Considering a two-dimension CPC, the aforesaid equation (1) can be rewritten as:

$$\frac{W_1}{W_2} = \left(\frac{n_2 \sin(\theta_2)}{n_1 \sin(\theta_1)}\right)^2 \quad (2)$$

$W_1$ and $W_2$ denote the width of CPC input and CPC output. According to equations (1) and (2), the output area is greater than the input area, and the CPC have better transferring efficiency between scattering light and collimating light. However, the greater size of the output means that the CPC will have a wider and thicker transmission body size.

Thus, providing a light-guide coupler having a thinner transmission body and greater transferring efficiency is a technical issue which needs to be solved in the technical field.

SUMMARY OF THE INVENTION

To solve the aforementioned technical problems, one objective of the present application is providing a light-guide coupler with thinner thickness of transmission body than the conventional light-guide coupler.

To achieve the aforementioned objective, the present application provides a light-guide coupler for modulating angular and spatial distributions of a light source. The light-guide coupler comprises a transmission body. One end of the transmission body defines a first opening and the other end of the transmission body defines a second opening. The width of the transmission body increases from the first opening to the second opening, and forms a curved portion in at least one side plane of the transmission body. A microstructure portion is configured on at least one plane of the transmission body. An inner reflecting surface is formed in the transmission body and matched to the microstructure portion and curved portion. The transmission body forms a light transmission path between the first opening and the second opening.

In comparison with the conventional CPC device, the light-guide coupler of present application configures the reflection plane of the curved portion and microstructure portion to form a transmission path between the first opening and the second opening in order to reduce the thickness of the transmission body. Therefore, the light-guide coupler of the present application has a much thinner transmission body than the conventional CPC device and also retains transferring efficiency between scattering light and collimating light.

BRIEF DESCRIPTION OF THE DRAWINGS

For a better understanding of the aforementioned embodiments of the invention as well as additional embodiments thereof, reference is made to the detailed description of the preferred embodiments below, in conjunction with the following drawings, in which like reference numerals refer to corresponding parts throughout the figures.

DETAILED DESCRIPTION OF THE PREFERRED EMBODIMENTS

The following description relates to embodiments of the present invention, but is not intended to limit the scope of the present invention.

Figure 1A:
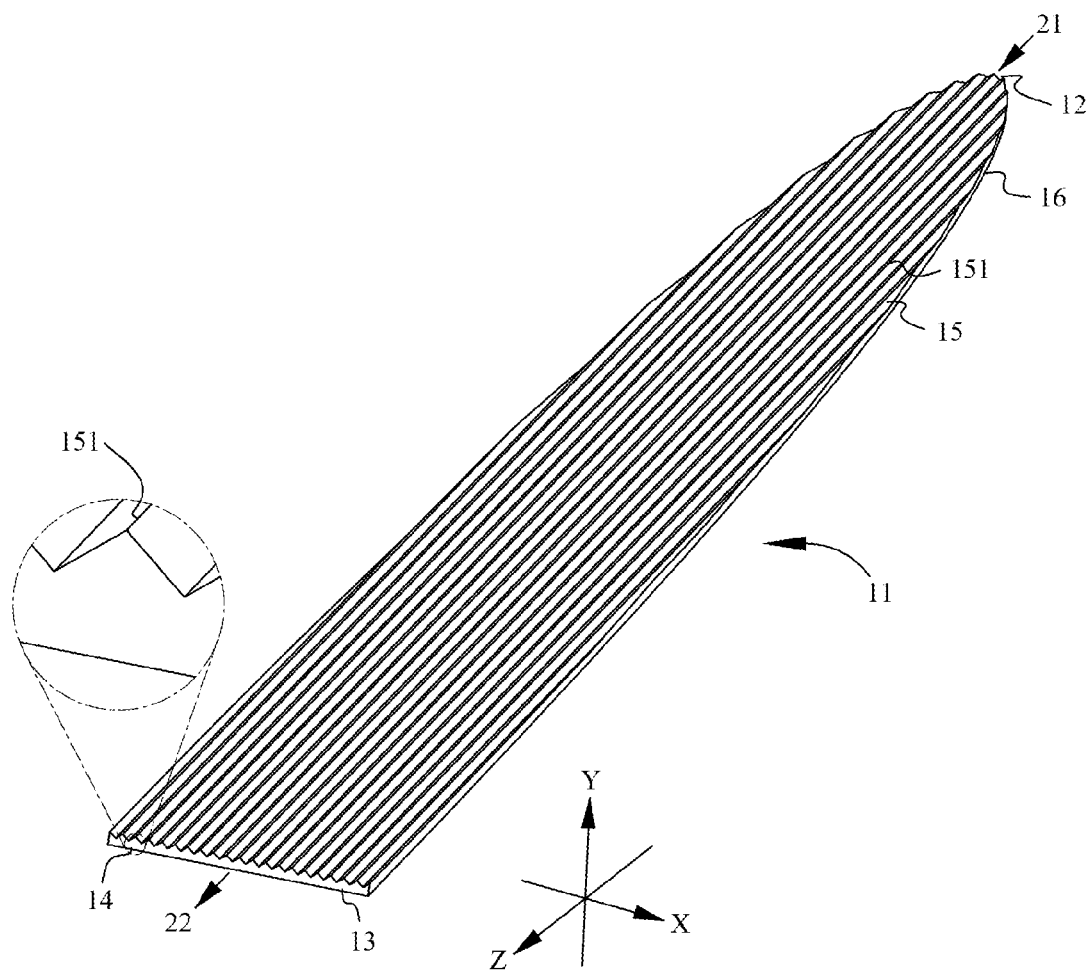
FIG. 1A shows a 3-D structure diagram of the light-guide coupler of the present application.
Figure 1B:
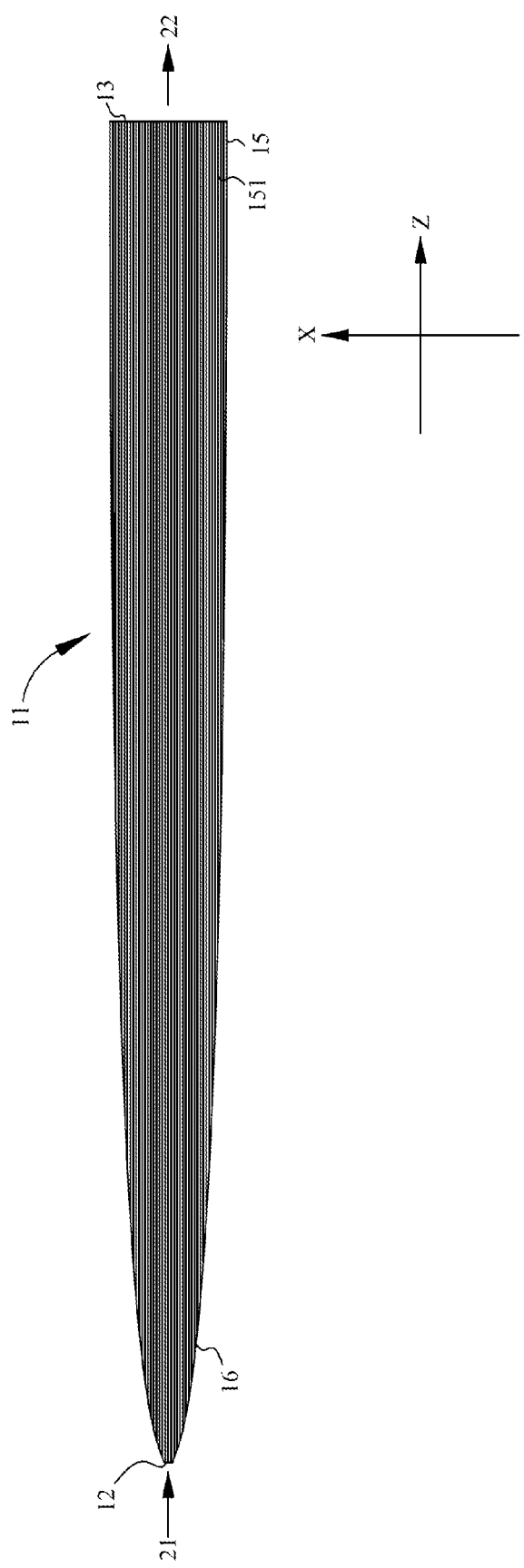
FIG. 1B shows an x-z plane structure diagram of the light-guide coupler of the present application.

FIG. 1A shows a 3D structure diagram of a light-guide coupler of the present application. FIG. 1B shows the horizontal plane (x-z plane) of the light-guide coupler of the present application. The light-guide coupler comprises a transmission body 11. One end of the transmission body 11 defines a first opening 12, and the other end of the transmission body 11 defines a second opening 13 (x-y plane). A microstructure portion 15 is configured on at least one plane of the transmission body 11. The inner reflecting surface 14 of the transmission body 11 is a closed surface and configured between the first opening 12 and the second opening 13. The inner reflecting surface 14 (total internal reflection surface) matches the microstructure portion 15 and curved portion 16 to form a light-transmission path. The width of the transmission body 11 increases in a direction from the first opening 12 to the second opening 13 and in a horizontal plane direction (x-z plane). At least one side plane of the transmission body 11 comprises the aforementioned curved portion 16.

The inner reflecting surface 14 is formed by the microstructure portion 15 and curved portion 16 so as to reduce the thickness of the transmission body 11. In the present application, the width of the transmission body 11 neighboring to the second opening 13 (x-axis direction) is greater than the thickness of the transmission body 11 (y-axis direction).

The aforementioned microstructure portion 15 comprises a plurality of linear microstructure devices 151 which are configured parallel to each other and along the direction from the second opening 13 to the first opening 12. The section shape of the microstructure device 151 comprises plane, polygon (for example: triangle, isosceles triangle, square, trapezoid . . . etc.), curve, or the combination thereof. The material of the light-guide coupler is selected from PMMA, glass, resin, or the combination thereof.

FIGS. 1A and 1B show the first embodiment of the present application. In the first embodiment, the first opening 12 is considered the input and the second opening 13 is considered the output. Insertion light 21 (scattering light) enters the first opening 12 and then travels to the second opening 13 through the reflection plane formed by the microstructure portion 15 and the curved portion 16. In the process of transmission, the light traveling back and forth constantly collides between the microstructure portion 15 and the curved portion 16 to reform the angle and spatial distribution of the output light 22.

In a further illustration of the previous transmission mechanism, the width transmission body 11 (x-axis direction) is greater than the thickness of the transmission body 11 (y-axis direction), and the microstructure devices 151 are configured on the horizontal plane (x-z plane) of the transmission body 11. After colliding with the microstructure device 151, traveling light having a large angle in the vertical plane direction (y-axis direction) would transfer to a traveling light having a large angle in the horizontal plane direction. When the aforesaid traveling light collides with the reflecting surface of the curved portion 16 in the y-axis direction of the transmission body 11, the angle of traveling light would be inversed to a smaller angle in the x-axis direction. By repeating the above mechanism, the angle distribution in the x-axis direction and y-axis direction are closed to each other. Accordingly, the light-guide coupler of present application is able to adjust the angle distribution of the insertion light 21 to the desired output light 22.

Figure 2A:
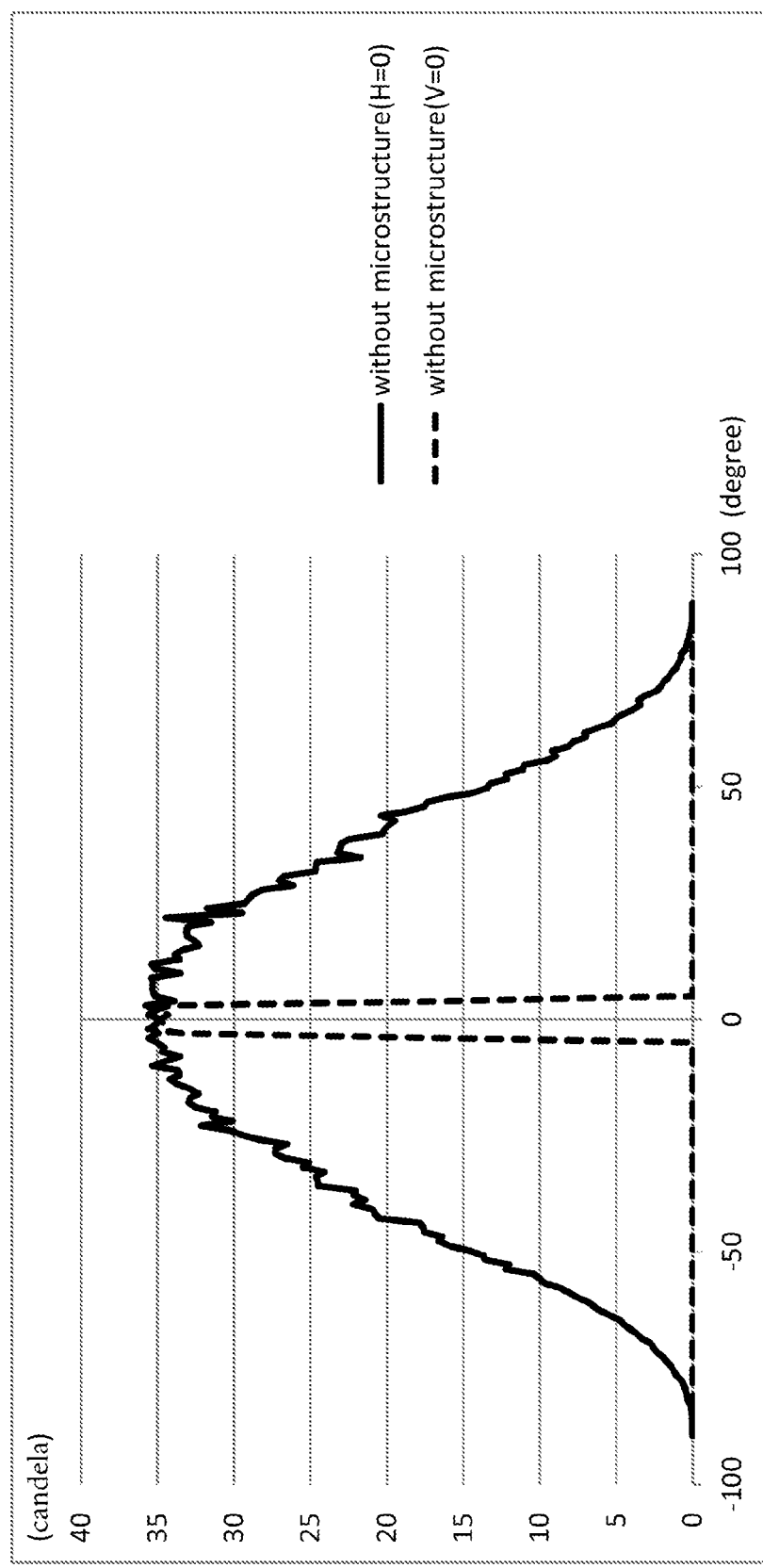
FIG. 2A and FIG. 2B show an angle distribution diagram of output light of a light-guide coupler with/without microstructure.
Figure 2B:
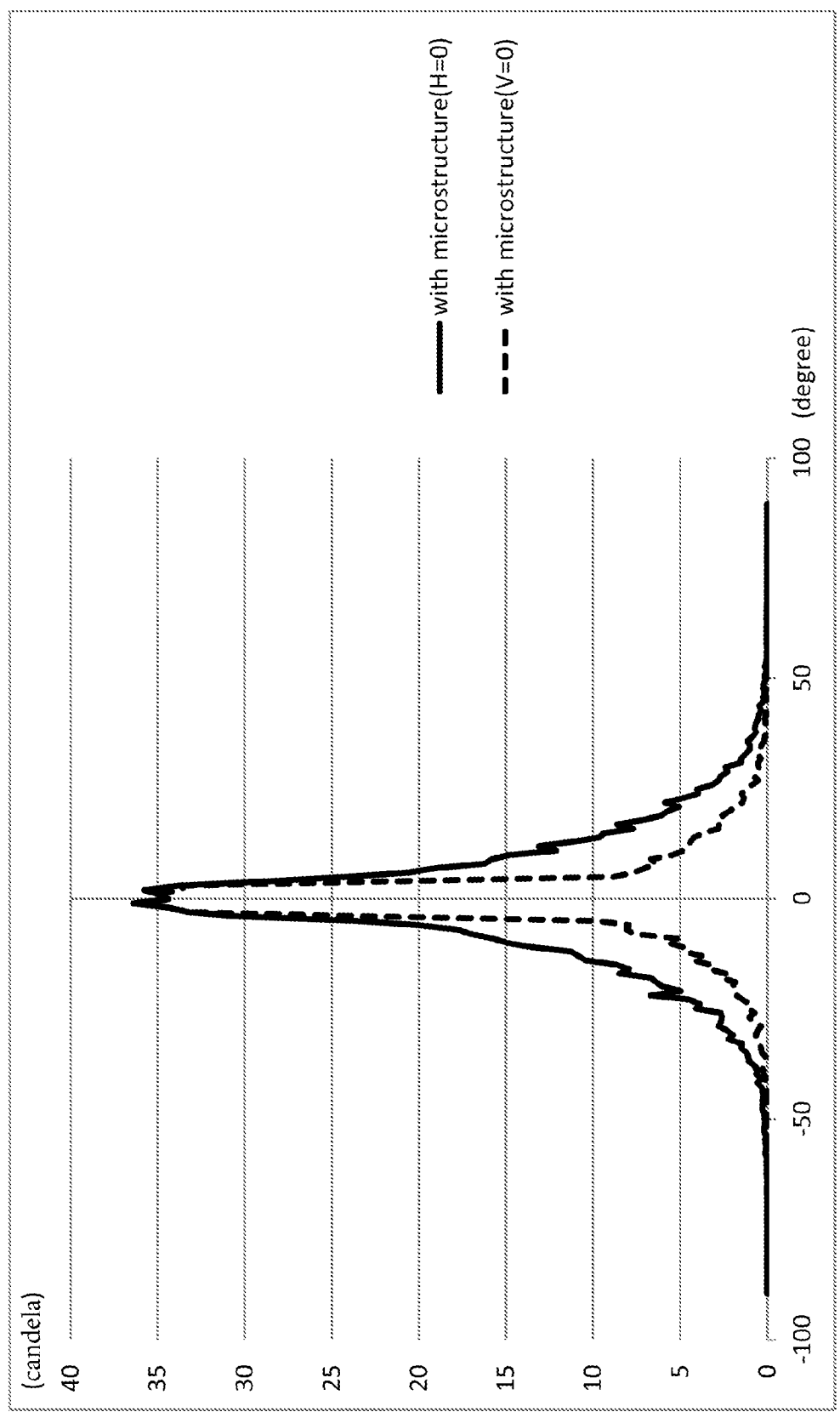

FIG. 2A shows the angle distribution of output light of the light-guide coupler without microstructure devices 151, and FIG. 2B shows the angle distribution of output light of the light-guide coupler with microstructure devices 151. The solid line in FIGS. 2A and 2B represents the light considered H=0 (vertical distribution). The broken line in FIGS. 2A and 2B represents the light considered V=0 (horizontal distribution). The light-guide coupler with the microstructure devices 151 would effectively reduce the angle distribution of output light 11.

Figure 3A:
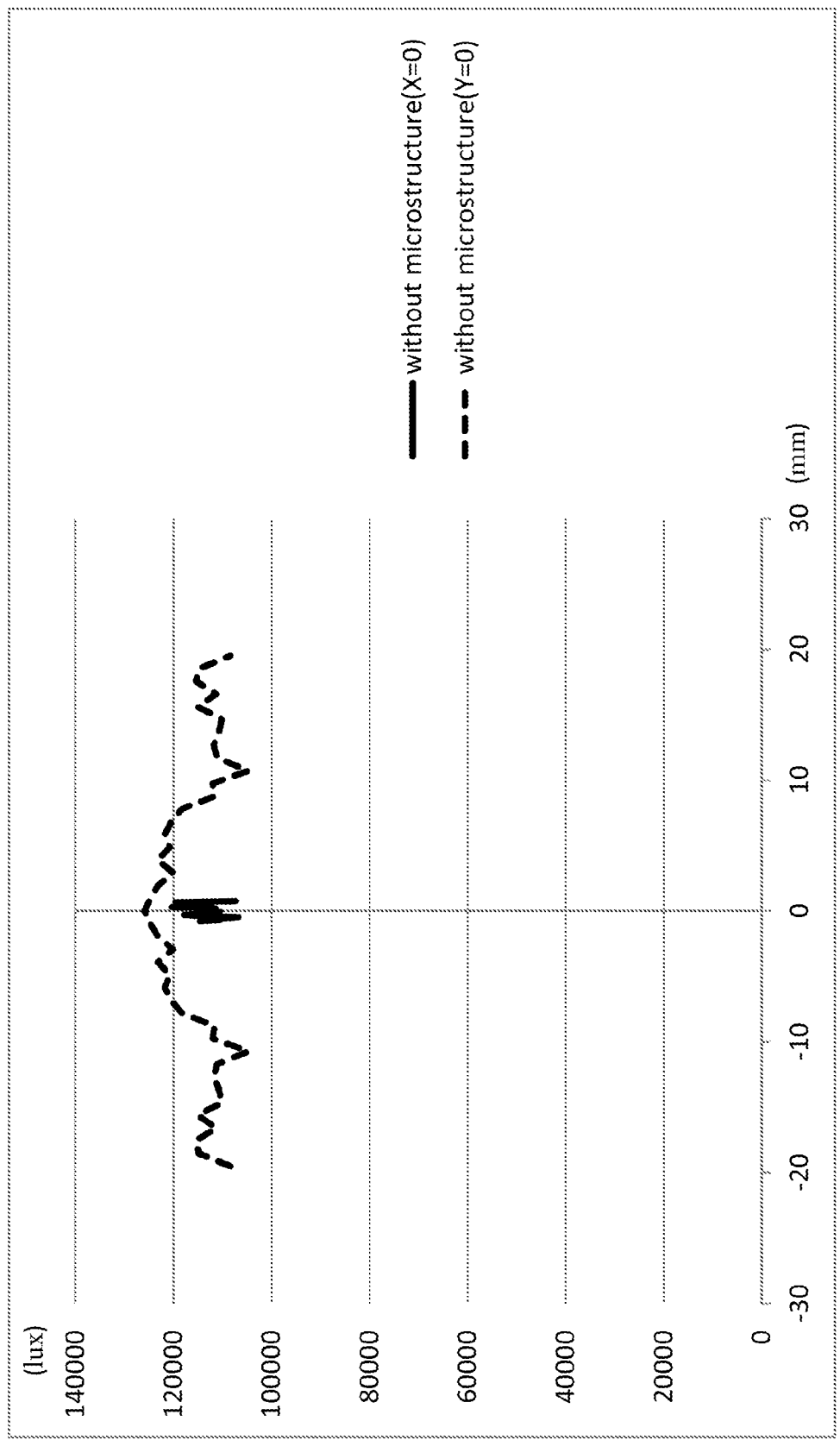
FIG. 3A and FIG. 3B show a position distribution diagram of output light of a light-guide coupler with/without microstructure.
Figure 3B:
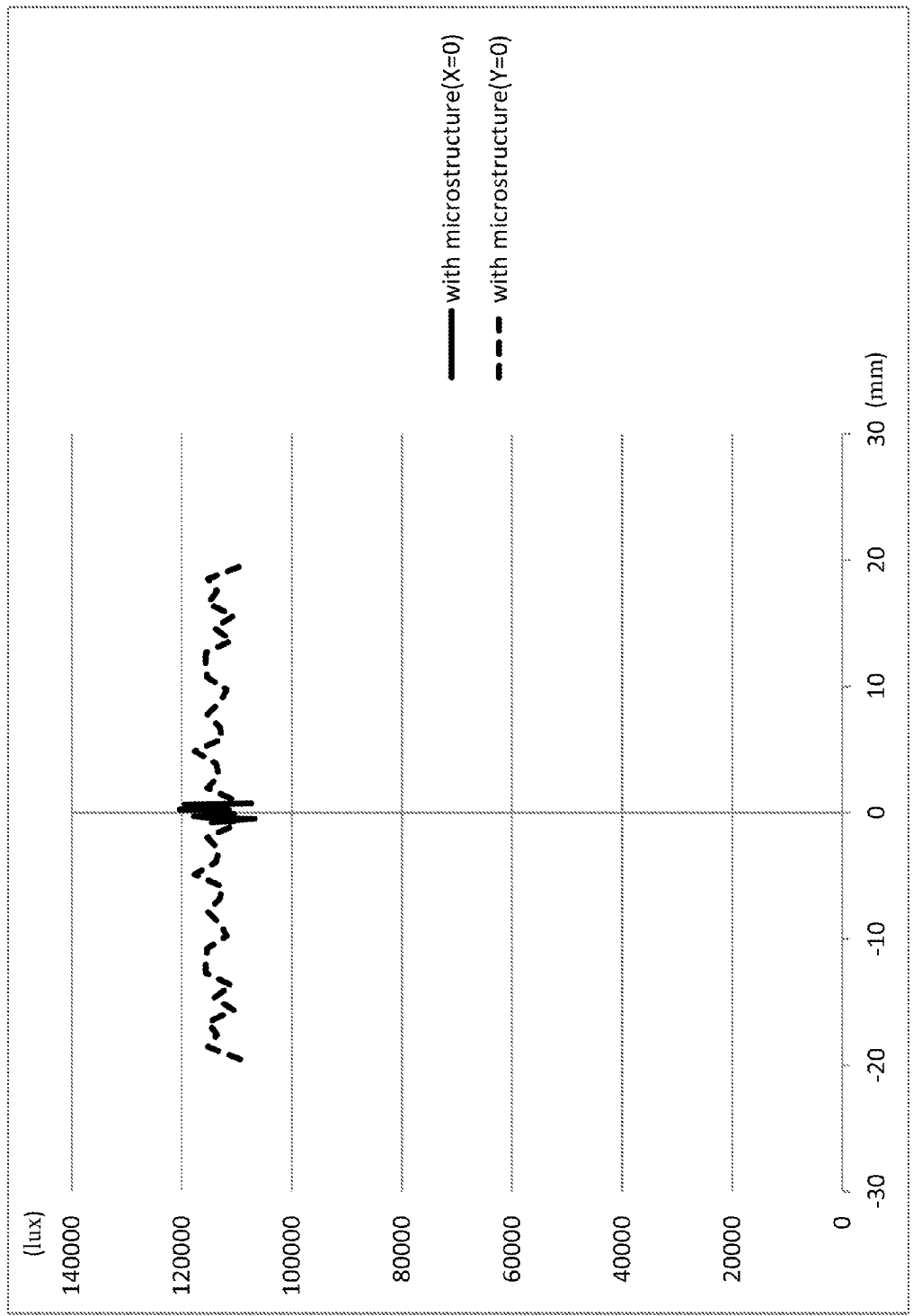

FIG. 3A shows the spatial distribution of output light 11 of the light-guide coupler without microstructure device 151, and FIG. 3B shows the spatial distribution of output light 11 of the light-guide coupler with microstructure device 151. The solid line in FIGS. 3A and 3B represents the light considered X=0. The broken line in FIGS. 3A and 3B represents the light considered Y=0. The light-guide coupler with the microstructure device 151 would effectively focus the distribution of output light.

FIGS. 1A and 1B also show the second embodiment of the present application. In the second embodiment, the first opening 12 is considered the output and the second opening 13 is considered the input. Based on reciprocity theory, when the collimating light enters the second opening 13 and transmits to the first opening through the transmission path, the output light would be transferred to scattering light.

As shown in FIGS. 2A, 2B, 3A, and 3B, the light-guide coupler of the present application can transfer scattering light to collimating light, or transfer collimating light to scattering light based on different input/output openings so as to meet specific requirements.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light-guide coupler for modulating angular and spatial distributions of a light source, comprising:
   a transmission body, one end of the transmission body defining a first opening, the other end of the transmission body defining a second opening, the width of the transmission body increasing in a direction from the first opening to the second opening and forming a curved portion in at least one side plane of the transmission body;
   a microstructure portion, configured on at least one plane of the transmission body, and comprising a plurality of microstructure devices; and
   an inner reflecting surface, formed in the transmission body and matched to the microstructure portion and the curved portion, the inner reflecting surface forming a light-transmission path between the first opening and the second opening,
   wherein the first opening defined as input and the second opening defined as output, or the first opening defines as output and the second opening defined as input,
   wherein the width of the transmission body increases in a horizontal plane, and the width of the transmission body neighboring the second opening is greater than the thickness of the transmission body, and
   wherein the microstructure devices are parallel to each other and linearly configured in a direction from the second opening to the first opening.

2. The light-guide coupler as claimed in claim 1, wherein the inner reflecting surface is a total internal reflection surface.

3. The light-guide coupler as claimed in claim 1, wherein the inner reflecting surface is a closed reflecting surface.

4. The light-guide coupler as claimed in claim 1, wherein a section shape of the microstructure device is at least one of plane, polygon, curve, or a combination thereof.

5. The light-guide coupler as claimed in claim 1, wherein the transmission body is a solid body.

6. The light-guide coupler as claimed in claim 1, wherein the curved portion is in a vertical plane of the transmission body.

7. The light-guide coupler as claimed in claim 1, wherein a material of the transmission body is at least one of PMMA, glass, resin, or a combination thereof.

8. The light-guide coupler as claimed in claim 1, wherein a material of the microstructure portion is at least one of PMMA, glass, resin, or a combination thereof.

* * * * *